United States Patent
Baldemair et al.

(10) Patent No.: US 11,617,144 B2
(45) Date of Patent: Mar. 28, 2023

(54) CELL IDENTIFICATION FOR RADIO ACCESS NETWORKS

(71) Applicant: Telefonaktiebolaget LM Ericsson (publ), Stockholm (SE)

(72) Inventors: Robert Baldemair, Solna (SE); Stefan Parkvall, Bromma (SE); Erik Dahlman, Stockholm (SE); Sorour Falahati, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/264,660

(22) PCT Filed: Aug. 6, 2018

(86) PCT No.: PCT/SE2018/050791
§ 371 (c)(1),
(2) Date: Jan. 29, 2021

(87) PCT Pub. No.: WO2020/032840
PCT Pub. Date: Feb. 13, 2020

(65) Prior Publication Data
US 2021/0337488 A1    Oct. 28, 2021

(30) Foreign Application Priority Data
Aug. 5, 2018 (WO) .................. PCT/SE2018/050786

(51) Int. Cl.
*H04W 56/00* (2009.01)
*H04J 11/00* (2006.01)
(Continued)

(52) U.S. Cl.
CPC ....... *H04W 56/001* (2013.01); *H04J 11/0056* (2013.01); *H04J 11/0093* (2013.01); *H04W 48/16* (2013.01); *H04W 16/10* (2013.01)

(58) Field of Classification Search
CPC ... H04W 56/001; H04W 48/16; H04W 16/10; H04J 11/0056; H04J 11/0093
See application file for complete search history.

(56) References Cited

U.S. PATENT DOCUMENTS

2011/0176435 A1   7/2011   Khandekar et al.
2013/0100823 A1   4/2013   Ren et al.
(Continued)

FOREIGN PATENT DOCUMENTS

| CN | 105828349 A | 8/2013 |
| WO | 2014098914 A1 | 6/2014 |
| WO | WO-2019143937 A1 * | 7/2019 |

OTHER PUBLICATIONS

International Search Report and Written Opinion dated Apr. 15, 2019 for International Application No. PCT/SE2018/050791, filed Aug. 6, 2018, consisting of 10-pages.
(Continued)

*Primary Examiner* — Shukri Taha
(74) *Attorney, Agent, or Firm* — Christopher & Weisberg, P.A.

(57) ABSTRACT

There is disclosed a method of operating a network node in a radio access network. The method includes determining an identity associated to a second network node based on received SS/PBCH block transmission received from the second network node and based on a determined time shift of the SS/PBCH block transmission relative to a slot structure. The disclosure also pertains to related devices and methods.

20 Claims, 5 Drawing Sheets

(51) Int. Cl.
  *H04W 48/16* (2009.01)
  *H04W 16/10* (2009.01)

(56) References Cited

U.S. PATENT DOCUMENTS

2013/0322289 A1* 12/2013 Zhu .................... H04J 3/14
                                                  370/252
2016/0294528 A1* 10/2016 Kim ................ H04L 5/0053
2022/0086774 A1*  3/2022 Qian ............... H04L 5/0048

OTHER PUBLICATIONS

International Search Report and Written Opinion dated Mar. 25, 2019 for International Application No. PCT/SE2018/050786, filed Aug. 5, 2018, consisting of 12-pages.
3GPP TSG RAN WG1 Meeting#88 R1-1701613; Title: Overview of Duplexing and Cross-link Interference Mitigation; Source: ZTE, ZTE Microelectronics; Agenda Item: 8.1.6; Document for: Discussion and Decision; Location and Date Athens, Greece, Feb. 13-17, 2017, consisting of 12-pages.
3GPP TSG-RAN WG4 Meeting NR Ad Hoc R4-1700208; Title: TP for NR Rel-14 TR 38.803: TDD timing budget; Source: Ericsson; Agenda Item: 3.4.3; Document for: Approval; Location and Date: Spokane, Washington, USA, Jan. 17-19, 2017, consisting of 10-pages.
3GPP TSG RAN Meeting #80 RP-180999;Title: Email discussion on Support on flexible duplex operation and remote interference management; Source: LG Electronics (Email discussion moderator); Agenda Item: 9.1.7; Document for: Discussion and Decision; Location and Date: La Jolla, CA, USA, Jun. 11-14, 2018, consisting of 10-pages.

* cited by examiner a)

b)  c)

CELL IDENTIFICATION FOR RADIO ACCESS NETWORKS

CROSS-REFERENCE TO RELATED APPLICATIONS

This application is a Submission Under 35 U.S.C. § 371 for U.S. National Stage Patent Application of International Application No.: PCT/SE2018/050791, filed Aug. 6, 2018 entitled "CELL IDENTIFICATION FOR RADIO ACCESS NETWORKS," which claims priority to International Application No.: PCT/SE2018/050786, filed Aug. 5, 2018, the entireties of both of which are incorporated herein by reference.

TECHNICAL FIELD

This disclosure pertains to wireless communication technology, in particular regarding 5G networks.

BACKGROUND

In wireless communication system, many kinds of interference can appear. In some cases, if the nature of interference can be identified, suitable counter measure can be performed against the specific type of interference.

A source of interference that is in particular relevant for TDD (Time Division Duplex, in which the same carrier is used for uplink and downlink by switching communication direction over time) may occur due to atmospheric conditions, which can lead to an atmospheric channel being formed, via which radio signaling from one part of a network can pass over larger distance to interfere with another network or another part of the same network. This is sometimes referred to as BS-to-BS (Base Station-to-Base Station) interference.

SUMMARY

It is an object of the present disclosure to provide approaches allowing identification of sources of interference.

The approaches are particularly advantageously implemented in a 5th Generation (5G) telecommunication network or 5G radio access technology or network (RAT/RAN), in particular according to 3GPP (3$^{rd}$ Generation Partnership Project, a standardisation organization). A suitable RAN may in particular be a RAN according to NR, for example release 15 or later, or LTE Evolution.

There is disclosed a method of operating a network node in a radio access network. The method comprising determining an identity associated to a second network node based on received SS/PBCH block transmission received from the second network node and based on a determined time shift of the SS/PBCH block transmission relative to a slot structure.

There is also proposed a network node for a radio access network. The network node is adapted to determine an identity associated to a second network node based on received SS/PBCH block transmission received from the second network node and based on a determined time shift of the SS/PBCH block transmission relative to a slot structure. The network node may comprise, and/or be adapted to utilise, processing circuitry and/or radio circuitry, in particular a transceiver and/or receiver, for determining the identity and/or receiving the SS/PBCH block transmission.

The network node may in particular be a radio node, e.g. a gNB or eNB or base station or other radio node. The network node may be referred to as receiving node or receiving network node. A network node and/or radio node transmitting the SS/PBCH block transmission may be referred to as transmitting node or transmitting radio node, or as interfering node.

The approaches described herein allow identification of possible interfering network nodes, and/or identification that BS-to-BS interference occurs, offering opportunities to perform corrective actions, e.g. in cooperation with other nodes, in particular the interfering node/s. The approaches in particular are adapted for networks with 5000 or more, or 10000 or more network nodes or cells, as in such networks the available number of physical cell IDs used to identity a cell are not sufficient and have to be reused for cells (typically so distant that cell of the same physical cell ID do not interfere at all). Determination of an identity based on this ID alone thus could be ambiguous.

The slot structure may be a transmission timing structure, e.g. defining a timing grid with slots comprising a plurality of symbols. The slot structure may represent a synchronisation and/or correspond to a time reference. The time shift may represent the location in time or shift in time of the SS/PBCH block transmission relative to the time reference and/or slot structure, e.g. in which symbol it starts and/or ends. Alternatively, or additionally, the time shift may represent a shift in time relative to an expected or configured time. For example, the network node may have information regarding when and/or which other nodes transmit SS/PBCH block transmission, and/or it some cases it may be assumed that all nodes transmit SS/PBCH blocks at the same time.

Determining the identity may comprise receiving the SS/PBCH block transmission in an UL time interval. An UL time interval may be a time interval in which the network node monitors a frequency or carrier for reception, and/or intends to receive signaling, e.g. according to scheduling. For TDD operation, different time intervals may be used for UL and DL for the same carrier. For FDD, in which separate parts of the spectrum are used for UL and DL, any time interval may be an UL time interval. In some cases, an UL time interval corresponds to a time interval for which the network node has allocated resources for UL transmission to one or more UEs.

It may be considered that the identity is and/or comprises a group identity and/or a cell identity and/or a network node identity. Alternatively, or additionally, the identity may be, or comprise a unique cell identifier and/or a global cell ID (GCI) or cell global ID (CGI) or similar. It may in particular be represented by, and/or correspond to, 12 or more bits, or 16 or more bits, or 20 or more bits, or 24 or more bits, or 28 or more bits. In some cases, determining the identity may comprise transmitting an identity indication indicating the identity to a third network node, which may be a radio network node or a core network node and/or a grouping node. Information may be provided to more than one node, in particular to radio nodes in the same group or groups as the network node (e.g., based on a group list or group configuration or grouping map), and/or an MME and/or a grouping node.

Determining the identity may be based on angular information pertaining to the received SS/PBCH block transmission. The angular information may pertain to the reception angle and/or direction of arrival, e.g. based on a sector or cell section in which the SS/PBCH block transmission is received, and/or a vertical and/or horizontal angle of reception, and/or based on a reception beam direction.

In some variants, determining the identity may be based on information indicating an association between distance and/or the determined time shift, and the identity. In particular, a grouping map may be used, which may provide the information.

Determining the identity may be based on network information indicating groups of network nodes and/or cells, and/or associated locations and/or distances, and/or delay time estimates or representation or limits. The network information may be represented by a list or map, e.g. a grouping map.

It may be considered that determining the identity may comprise transmitting an identity indication indicating the identity to a third network node, which may be a radio network node or a core network node and/or a grouping node. Information may be provided to more than one node, in particular to radio nodes in the same group or groups as the network node (e.g., based on a group list or group configuration or grouping map), and a MME or grouping node.

Determining the identity may be based on information regarding the frequency and/or periodicity of the SS/PBCH block transmission. Such information may be configured to the network node, e.g. by a grouping node and/or with a grouping map. The information may in particular indicate where on a carrier the SS/PBCH block is transmitted, and/or with which sequence and/or periodicity and/or burst structure. This information may be the same for all network nodes in a group, and/or in several groups, and/or for all nodes in a network.

There is also considered a program product comprising instructions adapted for causing processing circuitry to control and/or perform a method as described herein. Moreover, a carrier medium arrangement carrying and/or storing a program product as described herein may be considered. A system comprising a network node and a UE as described herein is also described, as well as an associated information system.

The network node/s and/or UEs may in particular be operated in TDD mode. In general, the network nodes may operate on the same carrier, and/or overlapping carriers and/or neighboring carriers, and/or carriers adjacent to each other in frequency space, with a small frequency gap between them (e.g., less than a carrier bandwidth, or between 200% and 50% thereof, or less). In particular, a receiving node may receive on or close to a carrier frequency used for transmission by a transmitting node. Network nodes may be associated to the same network, e.g. operated by the same operator, and/or utilising the same RAT. SS/PBCH block signaling may pass via an atmospheric channel.

An identity associated to a network node may in general indicate that signaling associated to that identity comes from a network node and/or is downlink signaling. As such, it may indicate interference from a network node (also referred to as Base Station-to Base Station (BS-BS) interference) occurring if it is received. This allows identifying the nature of interference. BS-to-BS interference may in general be interference caused by signaling, e.g. downlink signaling, transmitted by one (transmitting or interfering) network node like a gNB or base station and received, e.g. in a reception frequency range and/or during a reception time interval, e.g. UL time interval, by another (receiving or victim) network node.

BRIEF DESCRIPTION OF THE DRAWINGS

The drawings are provided to illustrate concepts and approaches described herein, and are not intended to limit their scope. The drawings comprise.

DETAILED DESCRIPTION

In the following, concepts and approaches are described in the context of NR technology. However, the concepts and approaches may be applied to other RATs and/or carrier types.

Figure 1:
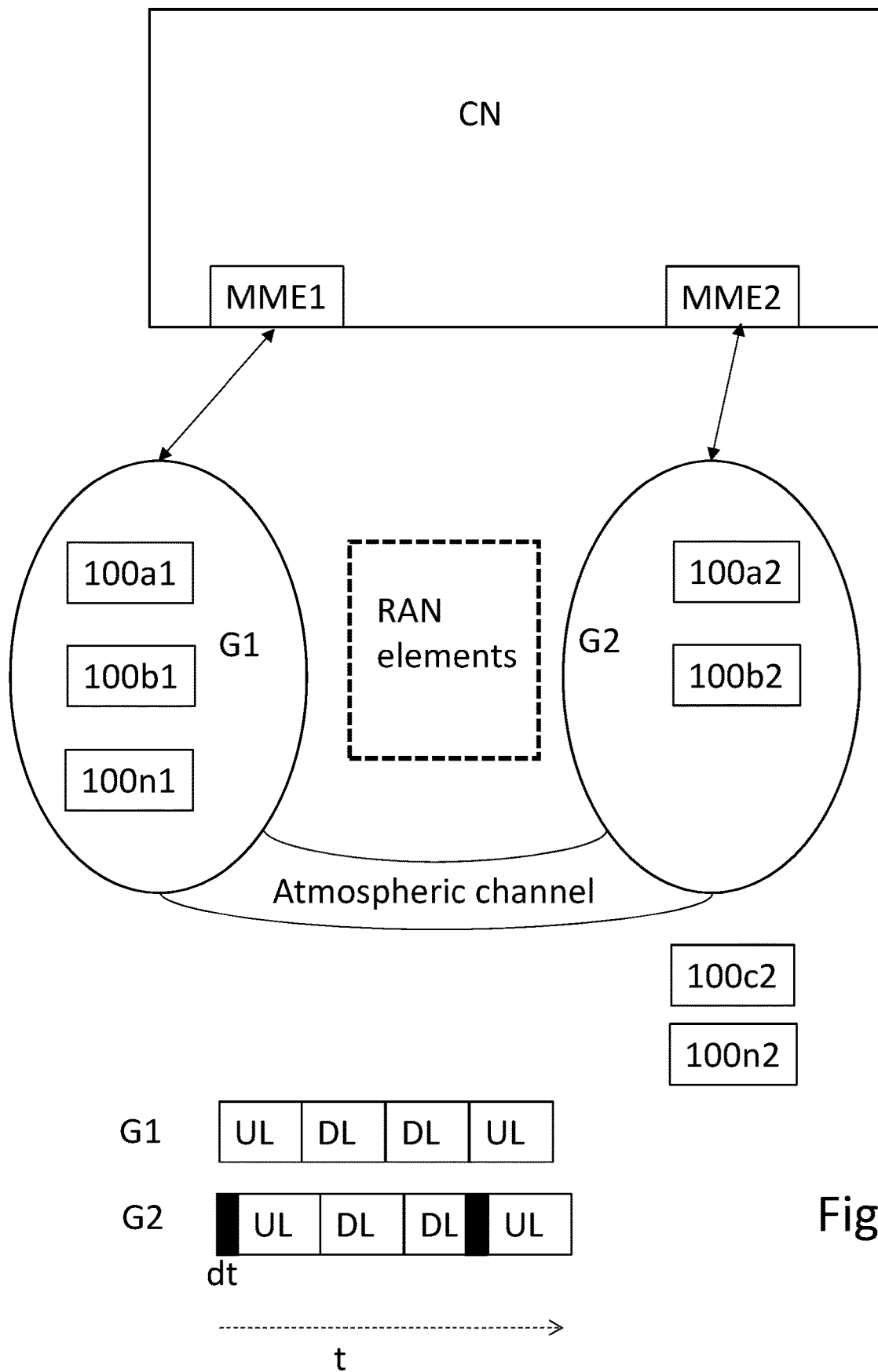
FIG. 1, showing an exemplary communication network.

FIG. 1 shows an exemplary communication network. The network may be run by one operator, or may comprise parts run by different operators. The network may comprise a plurality of network nodes 100 like gNbs or eNBs. The network nodes 100 may be arranged to be distributed over a large area, e.g. to be able to provide radio access for a region like a city and/or community and/or state and/or country. Any individual node may have one or more neighboring nodes which may be in physical proximity to the node. In physical proximity, radio cells provided by neighboring nodes may overlap and/or neighbor, e.g. on purpose and/or according to design. It may be considered that the possibility of handover is intended for neighboring network nodes. Neighboring network nodes may be connected to each other via a communication interface, e.g. an X2 or Xn or similar interface.

A network node may utilise a list of neighboring nodes and/or cells, which may also include a list of nodes operating according different RATS, e.g. UMTS or GSM. The list may be provided to one or more user equipments, e.g. with broadcast, unicast or multicast signaling, and/or RRC signaling or MAC signaling or even higher layer signaling. Network nodes 100 may be connected for communication, e.g. individually and/or via a common interface, to a core network (CN) via an intermediate node, e.g. a Mobility Management Entity (MME). Different nodes 100 may be connected to the CN via different MMEs. It may be considered that network nodes 100 and/or cells, which may be associated to nodes, are grouped, e.g. in group G1 and group G2. A connection between an MME and a network node may be via a corresponding interface, e.g. a S1 interface. An MME may be connected to higher CN layers, e.g. a gateway like a S-GW (Serving GateWay). In the CN, multiple entities or nodes may be arranged and/or included, via which communication between network nodes and/or user equipments or terminals may be routed. In FIG. 1, additional network nodes 100 and/or groups of nodes are indicated as RAN elements. A group of network nodes and/or cells may comprise a number NG of network nodes that may be 1 or larger. Different groups may have different sizes. The number and/or identity of network nodes in a group may be determined based on location and/or proximity and/or density of distribution of nodes and/or geography and/or transmission environment and/or radiation profile. A group may cover an area, in which cells and/or network nodes associated to the group may be arranged. It may be considered that for some cases, groups in regions with a higher density of network nodes and/or cells (per area) cover a smaller area than groups in regions with lower density. Example sizes of groups comprise 4 or more, 8 or more, 10 or more, 12 or more network nodes and/or cells. Grouping of network nodes and/or cells may be performed and/or configured by a grouping node, which may be a network node or a node of the CN, e.g. a MME or S-GW. In general, a network node may be grouped in one or more groups. A network node and/or a grouping node may determine, and/or have access to, representation or list of one or more groups, in particular of groups it belongs to and/or groups it configured or grouped. Signaling and/or cells of network nodes, in particular of network nodes in the same group, may be synchronised, e.g. according to a timing grid like a slot structure. Synchronised signaling may pertain to a shared time reference, which may indicate common timings, e.g. slot starts and/or ends. It may however be considered, that different numerologies are being used in different cells and/or by different nodes, which still may be synchronised, following the same time reference.

In general, neighboring network nodes may interfere with each other. However, in particular within networks run by the same operator, impact of such interference at the network side may be limited. In the case of TDD operation, the nodes may have a common UL/DL structure, in which the same slots (e.g., in a frame) may be associated to UL signaling and DL signaling, so that either all or at least most network nodes will be in transmission or reception at the same time. For FDD operation, in which different carriers are used for UL and DL, a network node is unlikely to receive DL transmission from another node on a carrier it is listening to.

However, in some cases, an atmospheric (or long distance) channel may develop that can bring interference from far away nodes. Due to atmospheric conditions and/or conditions of earth's magnetic field, or similar effects (e.g., solar influence), electromagnetic radiation such as signaling from radio nodes can be transmitted over large distance, e.g. through a channel or layer connection regions and/or network nodes or groups of network nodes. Such channels may connect groups or regions over larger distances, 10s or 100s of kilometers, or more. They may appear unexpectedly, and may be quite stable over time, enduring for minutes or hours. The areas, e.g. in cross-section or projection against the ground, of regions connected may dependent on the exact conditions, they may irregular and/or asymmetric. Signaling passing through an atmospheric channel will usually be directed and not be isotropic, such that its amplitude or power density may be a significant source of interference. It should be noted that a channel may be bidirectional and/or may have one or more regions of entry or exit of signaling. Signaling passing through a channel may undergo multiple deflections on borders of the channel.

In particular, if one of the regions connected is densely populated with network nodes, an atmospheric channel can have significant impact on the signaling environment. For example, user equipments may suddenly detect a cell that is very far away. The impact on the signaling environment of network nodes may be considerable. Signaling from one or more network nodes, or one or more groups of nodes, e.g. group G1 of FIG. 1, passing through an atmospheric channel to a distant region, e.g. covering group G2, is subject to a path delay (also referred to as time delay) dt, and may lose synchronisation between groups or regions, if there was any. Network nodes $100c2, \ldots, 100n2$ may be in the same region as the nodes of G2, but in this example are not included into group G2. They may be associated to one of a group $G3, \ldots, Gn$. It should be noted that not all network nodes of a group may be covered by a region included in or terminating a channel, and/or be affected by the interference provided by a channel. Signaling may also be spread in time and/or be spread or shifted in frequency to some degree. At the bottom of FIG. 1, there are shown two TDD slot arrangements for G1, G2, which in the example are assumed to be synchronised and co-aligned, having the same sequence of UL/DL slots, in the example UL/DL/DL/UL, starting at a common time reference used for both groups G1 and G2. This simple example is discussed to illustrate the nature of potential issues, more complicated setups may be analogously affected. In particular UL/DL may change on the symbol time interval level within a slot, e.g. depending on configuration. The diagram shows how the UL/DL structure used for signaling at G2 would arrive at G1 when passing through an atmospheric channel and subjected to a time delay dt. This delay dt may correspond to any delay, it does not necessary conform with the timing structure of the slot grid, but may lead to signaling structures being arbitrarily shifted against the slot structure, e.g. such that signaling starts within a symbol time interval, not at its beginning. Assuming co-alignment and synchronisation, G1 will follow the structure also used by G2 for its own cells and communication. In particular, in UL slots, it will monitor a TDD carrier for reception of uplink signaling from UEs in its cell. With the time delay dt, downlink signaling from G2 (one or more nodes) may extend into an uplink slot of G1, leading to signaling from network node/s from G2 interfering with signaling to be received by node/s in G1. It is conceivable that similar problems can occur for FDD, depending on the carriers used. For example, an FDD carrier used for DL in one node or group may be close enough in frequency domain to an FDD carrier used for UL in another group or node, such that the cells may interfere.

To ameliorate effects from atmospheric channel driven interference, it is helpful to identify the nature and/or source of the interference, in particular that it comes from a network node and/or from which network node. NR (also LTE) allow associating a physical cell ID to a cell, which may be encoded in broadcast signaling like synchronisation signaling, in particular a SS/PBCH block in NR or a PSS/SSS in LTE. The physical cell IDs are limited, and the total number of physical cell IDs are lower than the total possible cells distributed over all areas that may be affected by atmospheric channels. It may be considered to include the unique total cell ID (of which the physical cell ID may be a part), e.g. into a Primary Synchronisation Signaling (PSS) and/or Secondary Synchronisation Signaling (SSS) and/or a PBCH. In particular, each of PSS and/or SSS and/or PBCH may carry in full or in part bits of the total cell ID. The bits may be encoded into the signaling structure, in particular for PSS and/or SSS, e.g. in terms of its sequence and/or resources, and/or be represented by modulated bits, e.g. for PBCH.

It may be considered to provide a new reference signal or signaling (RS), which may be referred to as interference indication reference signaling (IIRS) or cell ID reference signaling (CIRS). A network node may be adapted to transmit the reference signaling. In another variant, a network node may be adapted to receive the reference signaling. The reference signaling may indicate the identity of the network node transmitting it, or of a group of network nodes it belongs to. The reference signaling may be represented by modulation symbols, which may be mapped to resources, e.g. resource elements, according to a sequence. The sequence may be a, or be based on, Gold sequence, or a Zadoff-Chu sequence, or a Golay sequence, or another suitable sequence, and/or of a set of orthogonal sequences. The sequence may be selected from a set of sequences, wherein the selection of a sequence may indicate the node or group. The set may be a set of sequence with suitable orthogonality, e.g. as indicated above Gold sequences, or Zadoff-Chu sequences or Golay sequences. A sequence may indicate in which modulation state and/or phase and/or value reference signaling is mapped to resource elements carrying the it, e.g. as sequence of values out of a set of {−1,1} or {−1,0,1} {−1,0,1,2} or similar. It may be considered that the set of sequences comprises at least 10, at least 100 or at least 1000 possible sequences. If the synchronisation signaling allows identification of around 1000 (e.g., 1000 or less, 700 or less, 500 or less, or in some cases 1300 or less) different physical cell IDs (several 100 or around 1000 is a typical number of available physical cell IDs), this would allow up to 1000000 different cells or groups to be identified by using the RS to supplement SS/PBCH block transmissions. Other numbers may be possible. In general, it may be considered that the reference signaling, or the reference signaling and other identity indicating signaling like synchronisation signaling, in particular SS/PBCH block transmission, may represent one out of a set of at least 10000, or at least 50000, or at least 100000 different identities. This may be achieved e.g. by providing suitable large and/or diverse sequences and/or resource for mapping suitable long sequences to resource elements. In some cases, information indicating the identity may be encoded into modulation symbols of the reference signaling.

Figure 2:
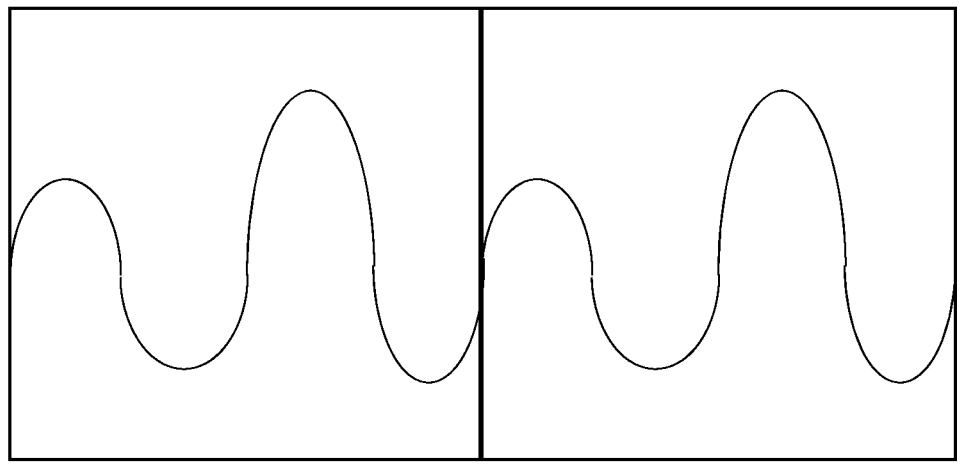
FIGS. 2a-c, showing exemplary reference signaling.
Figure 2:
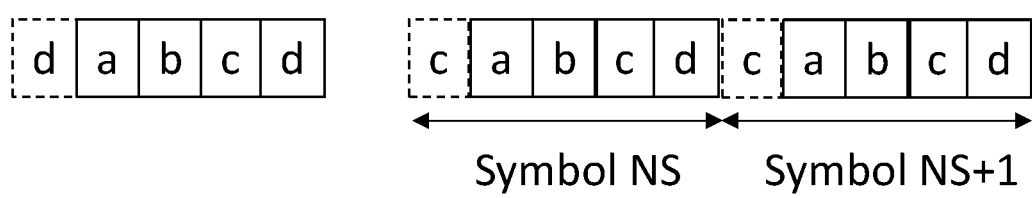

Indicating the node or group may be based on the reference signaling on its own, or it may be based on the reference signaling and another form of signaling, e.g. in combination. For example, the reference signaling may together with the physical cell ID as indicated by SS block signaling or other broadcast information indicate the group or node. Thus, information already supplied may be supplemented by the reference signaling. Assuming that the reference signaling can indicate 1000 different values, e.g. according to its sequence and/or location in time and/or frequency The reference signaling may cover in time domain 2 or more symbols, each of which may carry a modulation symbol or reference symbol, e.g. a BPSK or QPSK symbol. Two symbols neighboring in time on the same frequency, e.g. the same subcarrier, may be selected such that they have a smooth and/or differentiable connection at the symbol border on which they neighbor, as shown exemplarily in FIG. 2a. It may be considered in general that each symbol on the same carrier is repeated for 2 or more symbols, e.g. for two or more times/symbols (e.g., over the duration of the reference signaling). FIG. 2a shows a first symbol NS neighbored by symbol NS+1, which repeats symbol NS, and is differentiably connected to the symbol NS. In some cases, the repeating and/or succeeding symbol may be phase-shifted relative to the first and/or preceding symbol, e.g. to provide a smooth or differentiable connection. Phase-shifting may comprise cyclic shifting, such that the total signaling contents, e.g. the integrals over the symbols, are identical. Alternatively, or additionally, providing a differentiable connection in one of the neighboring symbols or in both of the neighboring symbols may be considered. Such connection may cover less than 20% or less than 10% or less than 5% of the duration of one symbol. The connection may be provided by a component or cyclic prefix (added at the leading edge in time domain of a succeeding symbol and/or component or cyclic suffix (added at the trailing edge in time of a preceding symbol). The appended prefix or suffix may be such that the symbol time length is not extended over the configured symbol time length, which may in some cases correspond to the symbol time length with cyclic prefix or extended cyclic prefix.

A component prefix or suffix may comprise and/or be represented by a part of a symbol structure that is appended at the leading edge or trailing edge (in time domain), respectively. The prefix or suffix may be connected smoothly and/or differentiably to the rest of the symbol structure. In general, smooth connection and/or differentiable connection may pertain to a signaling and/or modulation structure carried on a symbol, respectively a resource element on the symbol, in particular regarding amplitude and/or phase, and analogue regarding the connection between two neighboring symbols.

In FIG. 2b, there is shown a cyclic shift of a symbol having a cyclic prefix, representing a special form a component prefix (or suffix). The symbol structure is represented by symbol components ordered in time as a, b, c, d, and the cyclic prefix is represented by the leading "d" in the dashed borders. As can be seen, the prefix represents a cyclic appendix. An equivalent cyclic suffix would be "a" with the same symbol components.

FIG. 2c shows another variant of providing an appendix (a prefix or suffix), in the example a prefix. At symbol NS (e.g., in a slot), a symbol having a structure abcd may be provided, which may be repeated in symbol NS+1. A non-cyclic appendix (prefix in the example) may be provided. A non-cyclic appendix may represent an inner component of a component structure of a symbol having a number Q of at least 3 components. The inner component may be a component of the signaling structure that does not neighbor and/or extend to the symbol border (in time domain), and/or which is embedded within. For a cyclic appendix, an outer component may be used, which extends to a symbol border in time domain. It should be noted that in FIG. 2c, component "a" does not extend to a border of the symbol, as the symbol includes the prefix. A structure of prefix "a"-"abcd" may be seen as a symbol having non-cyclic appendix, as may "abcd"-suffix "d".

Figure 3:
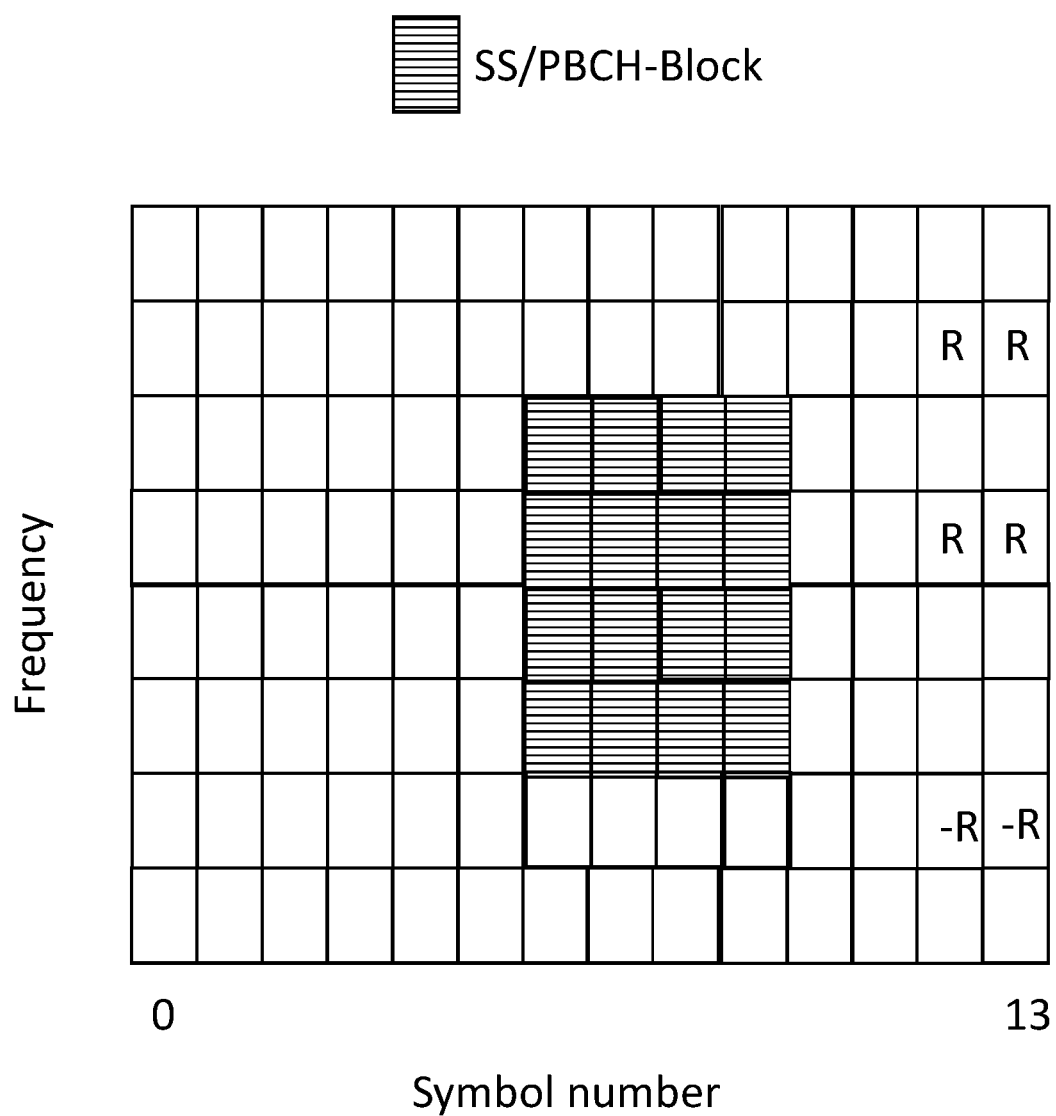
FIG. 3, showing an exemplary slot structure.

FIG. 3 shows an example of a slot structure. A slot may comprise a plurality of symbols in time domain, e.g. 14 (numbered from 0 to 13). A SS/PBCH block may be provided within the slot, which may carry synchronisation signaling, in particular PSS and/or SSS, and/or PBCH and/or PDSCH signaling. Alternatively, or additionally, reference signaling may be provided, e.g. as described herein, in particular in the context of FIG. 2. As can be seen, SS/PBCH block transmission represents a block in time/frequency space, and may have a substructure of PSS, SSS and PBCH parts. A plurality of SS/PBCH blocks may be included in a SS/PBCH block burst. Blocks in a burst may be separated in time by at least one symbol time interval, and/or by at most 9 or less, or 7 or less, or 4 or less symbol time intervals. Different blocks in a burst may be separated in time by different numbers of symbol time intervals. SS/PBCH blocks, in particular of a burst, may be on the same frequencies, e.g. bandwidth parts and/or subcarriers and/or PRBs. FIG. 3 shows exemplarily resource elements carrying symbols of the reference signal with R or −R, respectively corresponding to +1 or −1 in the mapping sequence. The resource elements carrying the reference signaling may be arranged differently, e.g. such that they are in a block with each RE carrying the RS (respectively, a symbol or signal part thereof) neighbored by at least one other RE carrying the reference signaling or symbol or a signal part thereof. The reference signaling may cover 2 or more symbols in time domain, e.g. 2, 3 or 4 symbols. In frequency domain, it may cover a number L1 of subcarriers or L2 of PRBs, starting from a subcarrier or PRB with lowest frequency to a subcarrier or PRB with a highest frequency of the range it covers in frequency domain. L may correspond to at least 20 PRBs and/or 240 subcarriers, or be larger. It may be considered that the reference signaling (CIRS) covers the frequency range of the SS/PBCH block transmitted by the network node (which may cover 4 symbols in time). The reference signaling may be transmitted in the same slot as SS/PBCH block transmission. However, in some cases, it may be transmitted in a different slot. In some cases, the network node is adapted to transmit SS/PBCH blocks regularly, e.g. in bursts of one or more blocks, within a radio frame, e.g. according to a period or in fixed intervals. Each burst may comprise one or more individual SS/PBCH block transmissions, which may be separated in time, e.g. spread over one or more slots. It may be assumed that not every slot in a frame carries SS/PBCH block transmission of a given network node. The reference signaling may be transmitted with the same frequency, or a different, in particular a lower frequency. In some cases, the reference signaling (CIRS) may be arranged at the end of a SS/PBCH Block transmission, e.g. neighboring in time. Alternatively, or additionally, the reference signaling (CIRS) may be located at the last symbols in a slot in which it is transmitted, e.g. slots 12 and 13, or 11 to 13, or 10 to 13, depending on its duration. It may be considered that a group or total cell ID of the transmitting node may be determined based on the reference signaling, and/or based on the reference signaling and other signaling, in particular SS/PBCH block signaling. A network node, or higher layer node, e.g. of the CN, like an MME may access data indicating and/or mapping reference signaling and/or SS/PBCH block signaling to a group and/or cell and/or node.

There may be considered a network node adapted to determine the identity associated to a second network node based on the reference signaling, and/or based on the reference signaling and associated SS/PBCH block transmission. In particular, it may be considered that a second network node (or receiving network node) is adapted for receiving the SS/PBCH block transmission associated to the received reference signaling (CIRS or IIRS) based on receiving the reference signaling. From the position of the reference signaling, e.g. at the end of transmission slot, the second network node may determine the relative timing (e.g., including the time delay dt), and may be able to monitor and/or find and/or identify the associated SS/PBCH block transmission more easily. Reception of the reference signaling may trigger receiving and/or monitoring for SS/PBCH block transmission. Such monitoring and/or receiving may be later in the same slot, or in a later slot, or in a time interval covering one or more later slots and/or SS/PBCH block transmission occasions of the transmitting node.

Alternatively, or additionally, a network node or radio node may be adapted to determine an identity based on SS/PBCH block transmission received, and a determined time shift of the received SS/PBCH block transmission. For example, the time shift may be relative to a slot timing structure, and/or relative to expected and/or indicated SS/PBCH block transmission and/or relative to SS/PBCH block transmission by the network node. SS/PBCH block transmission may be considered expected and/or indicated when the network node has been configured with information indicating when and/or on which time/frequency resources and/or which network node/s or group/s of nodes the SS/PBCH block transmission may be transmitted. The information may be provided by a list or map of network nodes and/or groups of network nodes. Determining identity based on SS/PBCH block transmission may comprise performing a cell search, and/or identifying a physical cell identity based on the SS/PBCH block received. Based on the time shift, from multiple possible cells or nodes to which the physical cell identity (which may comprise one or more components, e.g. cell group ID and cell ID, together representing the physical cell ID) may fit, one or more likely candidates may be selected. For example, a large time shift may indicate a large physical distance between the cells and/or nodes and/or groups, whereas a short time shift may indicate a short physical distance. In particular, the time shift may indicate an upper limit for the distance, considering that radio signaling propagates at the speed of light. Thus, determination of one candidate may be possible. In some cases, determination may be based on a determined angle of direction, in particular a vertical angle and/or a sector or section of a cell, e.g. based on a reception beam or reception beams on which the SS/PBCH block is received and/or an orientation of the sector or section. Determining the identity may be based on one or more additional parameters of the SS/PBCH block transmission, e.g. frequency, in particular subcarriers used for SS/PBCH block transmission, and/or periodicity. Periodicity may describe when and/or how often SS/PBCH blocks or bursts are transmitted. Different periodicities and/or frequencies may be mapped or mappable to different network nodes and/or cells and/or groups, e.g. according to the list or map. A map may be represented by one or more lists and/or tables, which may indicate any of the parameters or information discussed herein, and/or any combination thereof.

Alternatively, or additionally, a network node or radio node may be considered that is adapted to transmit an identity indication. The identity indication may be encoded in a broadcast signal, in particular PBCH and/or PDSCH. The identity indication may in particular be included in SS/PBCH transmission, e.g., in the PBCH part, and/or may complement synchronisation signaling for indicating the identity.

In general, an identity may be one out of a set of identities, which may be configurable and/or settable and/or configured and/or set for a network node or group of nodes, e.g. by or via a CN and/or MME and/or grouping node. In some cases, the identity may be preconfigured, e.g. when setting up the network node. The set of identities may comprise a number NI of different identities, wherein NI may be at least 5000, or at least 10000, or at least 20000, or at least 50000, or at least 100000. An identity indication may be provided by reference signaling and/or synchronisation signaling and/or broadcast signaling, e.g. a broadcast message and/or PBCH signaling or message, and/or PDSCH message. A PDSCH message may be associated to a SS/PBCH block, e.g. neighboring in time and/or frequency to SS/PBCH block transmission, and/or be in the same transmission or transmission block. An identity may be represented and/or representable by a number, e.g. an integer number. An identity may be considered to be associated to a network node if it configured and/or set and/or preconfigured for the network node. In some cases, a network node may be configured or preconfigured with a set of possible identities, one or more of which may be configured and/or indicated by a configuration. This allows changing with limited signaling overhead of identities during operation. It may be considered that the identity is and/or comprises a group identity and/or a cell identity and/or a network node identity. Alternatively, or additionally, the identity may be, or comprise a unique cell identifier and/or a global cell ID (GCI) or cell global ID (CGI) or similar. It may in particular be represented by, and/or correspond to, 12 or more bits, or 16 or more bits, or 20 or more bits, or 24 or more bits, or 28 or more bits.

A grouping node may be any network node grouping one or more networks nodes (e.g., radio nodes and/or transmitting radio nodes) into one or more groups and/or informing and/or configuring the grouped nodes correspondingly. A grouping node may be a radio node, or a node of a higher layer in the network, in particular a MME or S-GW or other gateway or managing node. Different grouping nodes may exchange information regarding groups, e.g. list and/or maps. It may be considered that a grouping managing node, which may be a grouping node itself, and/or may be at a higher network layer, may receive grouping information from one or more grouping nodes, based on which it may provide a grouping map of a plurality of groups. A group may generally comprise one or more network nodes. Grouping information and/or a grouping map may comprise information mapping group/s (and/or identities) to one or more parameters, e.g. reference signaling structure (e.g., sequence, resources and/or periodicity), and/or time-shift and/or distance and/or other parameters. Grouping information, and/or information representing a grouping map, may be configured to radio nodes, e.g. network nodes like gNBs or base stations. Thus, a network node or radio node may be informed about which network node is interfering based on the grouping map and determined identity. Alternatively, or additionally, a network node determining the identity may provide identity information to another node, e.g. another network node like a radio node/gNB/base station, and/or a higher layer node like a network node and/or grouping node.

Generally, the network node and the second network node may be synchronised in time, e.g. using the same time reference. In particular, transmissions by the nodes may be synchronised such that for example slot borders may coincide, e.g. at the beginning and/or end of a subframe or frame. A SS/PBCH block transmission may represent transmission of PSS and/or SSS and/or PBCH and/or PDSCH on resources of a SS/PBCH block. A network node will receive a transmission with at least a time shift due to traveling time.

Figure 4:
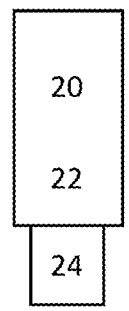
FIG. 4, showing an example of a radio node implemented as a terminal or UE.

FIG. 4 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 5:
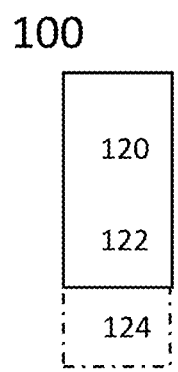
FIG. 5, showing an example of a radio node implemented as a network node, in particular a gNB.

FIG. 5 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

Subject transmission may be data signaling or control signaling. The transmission may be on a shared or dedicated channel. Data signaling may be on a data channel, for example on a PDSCH or PSSCH, or on a dedicated data channel, e.g. for low latency and/or high reliability, e.g. a URLLC channel. Control signaling may be on a control channel, for example on a common control channel or a PDCCH or PSCCH, and/or comprise one or more DCI messages or SCI messages. In some cases, the subject transmission may comprise, or represent, reference signaling. For example, it may comprise DM-RS and/or pilot signaling and/or discovery signaling and/or sounding signaling and/or phase tracking signaling and/or cell-specific reference signaling and/or user-specific signaling, in particular CSI-RS. A subject transmission may pertain to one scheduling assignment and/or one acknowledgement signaling process (e.g., according to identifier or subidentifier), and/or one subdivision. In some cases, a subject transmission may cross the borders of subdivisions in time, e.g. due to being scheduled to start in one subdivision and extending into another, or even crossing over more than one subdivision. In this case, it may be considered that the subject transmission is associated to the subdivision it ends in.

It may be considered that transmitting acknowledgement information, in particular of acknowledgement information, is based on determining whether the subject transmission/s has or have been received correctly, e.g. based on error coding and/or reception quality. Reception quality may for example be based on a determined signal quality. Acknowledgement information may generally be transmitted to a signaling radio node and/or node arrangement and/or to a network.

Acknowledgement information, or bit/s of a subpattern structure of such information, may represent and/or comprise one or more bits, in particular a pattern of bits. Multiple bits pertaining to a data structure or substructure or message like a control message may be considered a subpattern. The structure or arrangement of acknowledgement information may indicate the order, and/or meaning, and/or mapping, and/or pattern of bits (or subpatterns of bits) of the information. The structure or mapping may in particular indicate one or more data block structures, e.g. code blocks and/or code block groups and/or transport blocks and/or messages, e.g. command messages, the acknowledgement information pertains to, and/or which bits or subpattern of bits are associated to which data block structure. In some cases, the mapping may pertain to one or more acknowledgement signaling processes, e.g. processes with different identifiers, and/or one or more different data streams. The configuration or structure or codebook may indicate to which process/es and/or data stream/s the information pertains. Generally, the acknowledgement information may comprise one or more subpatterns, each of which may pertain to a data block structure, e.g. a code block or code block group or transport block. A subpattern may be arranged to indicate acknowledgement or non-acknowledgement, or another retransmission state like non-scheduling or non-reception, of the associated data block structure. It may be considered that a subpattern comprises one bit, or in some cases more than one bit. It should be noted that acknowledgement information may be subjected to significant processing before being transmitted with acknowledgement signaling. Different configurations may indicate different sizes and/or mapping and/or structures and/or pattern.

An acknowledgment signaling process (providing acknowledgment information) may be a HARQ process, and/or be identified by a process identifier, e.g. a HARQ process identifier or subidentifier. Acknowledgement signaling, and/or associated acknowledgement information, may be referred to as feedback or acknowledgement feedback. It should be noted that data blocks or structures to which subpatterns may pertain may be intended to carry data (e.g., information and/or systemic and/or coding bits). However, depending on transmission conditions, such data may be received or not received (or not received correctly), which may be indicated correspondingly in the feedback. In some cases, a subpattern of acknowledgement signaling may comprise padding bits, e.g. if the acknowledgement information for a data block requires fewer bits than indicated as size of the subpattern. Such may for example happen if the size is indicated by a unit size larger than required for the feedback.

Acknowledgment information may generally indicate at least ACK or NACK, e.g. pertaining to an acknowledgment signaling process, or an element of a data block structure like a data block, subblock group or subblock, or a message, in particular a control message. Generally, to an acknowledgment signaling process there may be associated one specific subpattern and/or a data block structure, for which acknowledgment information may be provided. Acknowledgement information may comprise a plurality of pieces of information, represented in a plurality of HARQ structures.

An acknowledgment signaling process may determine correct or incorrect reception, and/or corresponding acknowledgement information, of a data block like a transport block, and/or substructures thereof, based on coding bits associated to the data block, and/or based on coding bits associated to one or more data block and/or subblocks and/or subblock group/s. Acknowledgement information (determined by an acknowledgement signaling process) may pertain to the data block as a whole, and/or to one or more subblocks or subblock groups. A code block may be considered an example of a subblock, whereas a code block group may be considered an example of a subblock group. Accordingly, the associated subpattern may comprise one or more bits indicating reception status or feedback of the data block, and/or one or more bits indicating reception status or feedback of one or more subblocks or subblock groups. Each subpattern or bit of the subpattern may be associated and/or mapped to a specific data block or subblock or subblock group. In some variants, correct reception for a data block may be indicated if all subblocks or subblock groups are correctly identified. In such a case, the subpattern may represent acknowledgement information for the data block as a whole, reducing overhead in comparison to provide acknowledgement information for the subblocks or subblock groups. The smallest structure (e.g. subblock/subblock group/data block) the subpattern provides acknowledgement information for and/or is associated to may be considered its (highest) resolution. In some variants, a subpattern may provide acknowledgment information regarding several elements of a data block structure and/or at different resolution, e.g. to allow more specific error detection. For example, even if a subpattern indicates acknowledgment signaling pertaining to a data block as a whole, in some variants higher resolution (e.g., subblock or subblock group resolution) may be provided by the subpattern. A subpattern may generally comprise one or more bits indicating ACK/NACK for a data block, and/or one or more bits for indicating ACK/NACK for a subblock or subblock group, or for more than one subblock or subblock group.

A subblock and/or subblock group may comprise information bits (representing the data to be transmitted, e.g. user data and/or downlink/sidelink data or uplink data). It may be considered that a data block and/or subblock and/or subblock group also comprises error one or more error detection bits, which may pertain to, and/or be determined based on, the information bits (for a subblock group, the error detection bit/s may be determined based on the information bits and/or error detection bits and/or error correction bits of the subblock/s of the subblock group). A data block or substructure like subblock or subblock group may comprise error correction bits, which may in particular be determined based on the information bits and error detection bits of the block or substructure, e.g. utilising an error correction coding scheme, e.g. LDPC or polar coding. Generally, the error correction coding of a data block structure (and/or associated bits) may cover and/or pertain to information bits and error detection bits of the structure. A subblock group may represent a combination of one or more code blocks, respectively the corresponding bits. A data block may represent a code block or code block group, or a combination of more than one code block groups. A transport block may be split up in code blocks and/or code block groups, for example based on the bit size of the information bits of a higher layer data structure provided for error coding and/or size requirements or preferences for error coding, in particular error correction coding. Such a higher layer data structure is sometimes also referred to as transport block, which in this context represents information bits without the error coding bits described herein, although higher layer error handling information may be included, e.g. for an internet protocol like TCP. However, such error handling information represents information bits in the context of this disclosure, as the acknowledgement signaling procedures described treat it accordingly.

In some variants, a subblock like a code block may comprise error correction bits, which may be determined based on the information bit/s and/or error detection bit/s of the subblock. An error correction coding scheme may be used for determining the error correction bits, e.g. based on LDPC or polar coding or Reed-Mueller coding. In some cases, a subblock or code block may be considered to be defined as a block or pattern of bits comprising information bits, error detection bit/s determined based on the information bits, and error correction bit/s determined based on the information bits and/or error detection bit/s. It may be considered that in a subblock, e.g. code block, the information bits (and possibly the error correction bit/s) are protected and/or covered by the error correction scheme or corresponding error correction bit/s. A code block group may comprise one or more code blocks. In some variants, no additional error detection bits and/or error correction bits are applied, however, it may be considered to apply either or both. A transport block may comprise one or more code block groups. It may be considered that no additional error detection bits and/or error correction bits are applied to a transport block, however, it may be considered to apply either or both. In some specific variants, the code block group/s comprise no additional layers of error detection or correction coding, and the transport block may comprise only additional error detection coding bits, but no additional error correction coding. This may particularly be true if the transport block size is larger than the code block size and/or the maximum size for error correction coding. A subpattern of acknowledgement signaling (in particular indicating ACK or NACK) may pertain to a code block, e.g. indicating whether the code block has been correctly received. It may be considered that a subpattern pertains to a subgroup like a code block group or a data block like a transport block. In such cases, it may indicate ACK, if all subblocks or code blocks of the group or data/transport block are received correctly (e.g. based on a logical AND operation), and NACK or another state of non-correct reception if at least one subblock or code block has not been correctly received. It should be noted that a code block may be considered to be correctly received not only if it actually has been correctly received, but also if it can be correctly reconstructed based on soft-combining and/or the error correction coding.

A subpattern/HARQ structure may pertain to one acknowledgement signaling process and/or one carrier like a component carrier and/or data block structure or data block. It may in particular be considered that one (e.g. specific and/or single) subpattern pertains, e.g. is mapped by the codebook, to one (e.g., specific and/or single) acknowledgement signaling process, e.g. a specific and/or single HARQ process. It may be considered that in the bit pattern, subpatterns are mapped to acknowledgement signaling processes and/or data blocks or data block structures on a one-to-one basis. In some variants, there may be multiple subpatterns (and/or associated acknowledgment signaling processes) associated to the same component carrier, e.g. if multiple data streams transmitted on the carrier are subject to acknowledgement signaling processes. A subpattern may comprise one or more bits, the number of which may be considered to represent its size or bit size. Different bit n-tupels (n being 1 or larger) of a subpattern may be associated to different elements of a data block structure (e.g., data block or subblock or subblock group), and/or represent different resolutions. There may be considered variants in which only one resolution is represented by a bit pattern, e.g. a data block. A bit n-tupel may represent acknowledgement information (also referred to a feedback), in particular ACK or NACK, and optionally, (if n>1), may represent DTX/DRX or other reception states. ACK/NACK may be represented by one bit, or by more than one bit, e.g. to improve disambiguity of bit sequences representing ACK or NACK, and/or to improve transmission reliability.

The acknowledgement information or feedback information may pertain to a plurality of different transmissions, which may be associated to and/or represented by data block structures, respectively the associated data blocks or data signaling. The data block structures, and/or the corresponding blocks and/or signaling, may be scheduled for simultaneous transmission, e.g. for the same transmission timing structure, in particular within the same slot or subframe, and/or on the same symbol/s. However, alternatives with scheduling for non-simultaneous transmission may be considered. For example, the acknowledgment information may pertain to data blocks scheduled for different transmission timing structures, e.g. different slots (or mini-slots, or slots and mini-slots) or similar, which may correspondingly be received (or not or wrongly received). Scheduling signaling may generally comprise indicating resources, e.g. time and/or frequency resources, for example for receiving or transmitting the scheduled signaling.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots. A subframe may comprise 1 or more slots, depending on numerology. A frame may comprise 10 subframes.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc. A carrier medium and/or storage medium may in particular be a non-transitory medium.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or a data channels. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangement associated to a UE or terminal may be smaller (e.g., in size and/or number of antenna elements or arrays) than the antenna arrangement associated to a network node. Antenna elements of an antenna arrangement may be configurable for different arrays, e.g. to change the beam forming characteristics. In particular, antenna arrays may be formed by combining one or more independently or separately controllable antenna elements or subarrays. The beams may be provided by analog beamforming, or in some variants by digital beamforming. The informing radio nodes may be configured with the manner of beam transmission, e.g. by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) to convert digital control information into an analog antenna feed for the whole antenna arrangement (the ADC may be considered part of, and/or connected or connectable to, antenna circuitry). A scenario in which each antenna element is individually controllable may be referred to as digital beamforming, whereas a scenario in which larger arrays/subarrays are separately controllable may be considered an example of analog beamforming. Hybrid forms may be considered.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN as described herein.

The terms wireless device, user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns or bit fields representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate. A radio node that is a network node may be referred to as radio network node.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be send over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbols. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting.

Acknowledgement information may comprise an indication of a specific value or state for an acknowledgement signaling process, e.g. ACK or NACK or DTX. Such an indication may for example represent a bit or bit value or bit pattern or an information switch. Different levels of acknowledgement information, e.g. providing differentiated information about quality of reception and/or error position in received data element/s may be considered and/or represented by control signaling. Acknowledgment information may generally indicate acknowledgment or non-acknowledgment or non-reception or different levels thereof, e.g. representing ACK or NACK or DTX. Acknowledgment information may pertain to one acknowledgement signaling process. Acknowledgement signaling may comprise acknowledgement information pertaining to one or more acknowledgement signaling processes, in particular one or more HARQ or ARQ processes. It may be considered that to each acknowledgment signaling process the acknowledgement information pertains to, a specific number of bits of the information size of the control signaling is assigned. Measurement reporting signaling may comprise measurement information.

Signaling may generally comprise one or more symbols and/or signals and/or messages. A signal may comprise and/or represent one or more bits, which may be modulated into a common modulated signal. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling.

Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (CQI), and/or Scheduling Request (SR) signaling. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

A code block may be considered a subelement of a data element like a transport block, e.g., a transport block may comprise a one or a plurality of code blocks.

A scheduling assignment may be configured with control signaling, e.g. downlink control signaling or sidelink control signaling. Such controls signaling may be considered to represent and/or comprise scheduling signaling, which may indicate scheduling information. A scheduling assignment may be considered scheduling information indicating scheduling of signaling/transmission of signaling, in particular pertaining to signaling received or to be received by the device configured with the scheduling assignment. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or indicate resource/s for associated feedback signaling, and/or a feedback resource range on which associated feedback signaling is to be transmitted. Transmission associated to an acknowledgement signaling process, and/or the associated resources or resource structure, may be configured and/or scheduled, for example by a scheduling assignment. Different scheduling assignments may be associated to different acknowledgement signaling processes. A scheduling assignment may be considered an example of downlink control information or signaling, e.g. if transmitted by a network node and/or provided on downlink (or sidelink control information if transmitted using a sidelink and/or by a user equipment).

A scheduling grant (e.g., uplink grant) may represent control signaling (e.g., downlink control information/signaling). It may be considered that a scheduling grant configures the signaling resource range and/or resources for uplink (or sidelink) signaling, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/ usable for the feedback signaling, in particular whether a shared channel like a PUSCH may be used/is to be used. A scheduling grant may generally indicate uplink resource/s and/or an uplink channel and/or a format for control information pertaining to associated scheduling assignments. Both grant and assignment/s may be considered (downlink or sidelink) control information, and/or be associated to, and/or transmitted with, different messages.

A resource structure in frequency domain (which may be referred to as frequency interval and/or range) may be represented by a subcarrier grouping. A subcarrier grouping may comprise one or more subcarriers, each of which may represent a specific frequency interval, and/or bandwidth. The bandwidth of a subcarrier, the length of the interval in frequency domain, may be determined by the subcarrier spacing and/or numerology. The subcarriers may be arranged such that each subcarrier neighbours at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, it transmission for such channel or signaling is scheduled and/or transmitted and/or intended and/or configured for at least one, or a plurality, or all subcarriers in the grouping. Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signalings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling).

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

| Abbreviation | Explanation |
| --- | --- |
| ACK/NACK | Acknowledgment/Negative Acknowledgement |
| ARQ | Automatic Repeat reQuest |
| CAZAC | Constant Amplitude Zero Cross Correlation |
| CB | Code Block |
| CBG | Code Block Group |
| CDM | Code Division Multiplex |
| CM | Cubic Metric |
| CQI | Channel Quality Information |
| CRC | Cyclic Redundancy Check |
| CRS | Common reference signal |
| CSI | Channel State Information |
| CSI-RS | Channel state information reference signal |
| DAI | Downlink Assignment Indicator |
| DCI | Downlink Control Information |
| DFT | Discrete Fourier Transform |
| DM(-)RS | Demodulation reference signal(ing) |
| FDD | Frequency Division Duplex |
| FDM | Frequency Division Multiplex |
| HARQ | Hybrid Automatic Repeat Request |
| IFFT | Inverse Fast Fourier Transform |
| MBB | Mobile Broadband |
| MCS | Modulation and Coding Scheme |
| MIMO | Multiple-input-multiple-output |
| MRC | Maximum-ratio combining |
| MRT | Maximum-ratio transmission |
| MU-MIMO | Multiuser multiple-input-multiple-output |
| OFDM/A | Orthogonal Frequency Division Multiplex/Multiple Access |
| PAPR | Peak to Average Power Ratio |
| PDCCH | Physical Downlink Control Channel |
| PDSCH | Physical Downlink Shared Channel |
| PRACH | Physical Random Access CHannel |
| PRB | Physical Resource Block |
| PUCCH | Physical Uplink Control Channel |
| PUSCH | Physical Uplink Shared Channel |
| (P)SCCH | (Physical) Sidelink Control Channel |
| (P)SSCH | (Physical) Sidelink Shared Channel |
| RAN | Radio Access Network |
| RAT | Radio Access Technology |
| RB | Resource Block |
| RRC | Radio Resource Control |
| SA | Scheduling Assignment |
| SC-FDM/A | Single Carrier Frequency Division Multiplex/Multiple Access |
| SCI | Sidelink Control Information |
| SINR | Signal-to-interference-plus-noise ratio |
| SIR | Signal-to-interference ratio |

-continued

| Abbreviation | Explanation |
| --- | --- |
| SNR | Signal-to-noise-ratio |
| SR | Scheduling Request |
| SRS | Sounding Reference Signal(ing) |
| SVD | Singular-value decomposition |
| TB | Transport Block |
| TDD | Time Division Duplex |
| TDM | Time Division Multiplex |
| UCI | Uplink Control Information |
| UE | User Equipment |
| URLLC | Ultra Low Latency High Reliability Communication |
| VL-MIMO | Very-large multiple-input-multiple-output |
| ZF | Zero Forcing |

Abbreviations may be considered to follow 3GPP usage if applicable.

The invention claimed is:

1. A method of operating a network node in a radio access network, the method comprising:
    determining an identity associated to a second network node based on:
        a received Synchronization Signal/Physical Broadcast Channel, SS/PBCH, block transmission received from the second network node; and
        a determined time shift of the SS/PBCH block transmission relative to a slot structure.

2. A network node for a radio access network, the network node configured to:
    determine an identity associated to a second network node based on:
        a received Synchronization Signal/Physical Broadcast Channel, SS/PBCH, block transmission received from the second network node; and
        a determined time shift of the SS/PBCH block transmission relative to a slot structure.

3. The method according to claim 1, wherein determining the identity comprises receiving the SS/PBCH block transmission in an Up Link, UL, time interval.

4. The method according to claim 1, wherein the identity is one of a group identity, a cell identity and a network node identity.

5. The method according to claim 1, wherein determining the identity is based on angular information pertaining to the received SS/PBCH block transmission.

6. The method according to claim 1, wherein determining the identity is based on information indicating an association between the identity and at least one of:
    distance; and
    the determined time shift.

7. The method according to claim 1, wherein determining the identity is based on network information indicating at least one of:
    groups of network nodes;
    groups of cells;
    associated locations; and
    distances.

8. The method according to claim 1, wherein determining the identity comprises transmitting an identity indication indicating the identity to a third network node.

9. The method according to claim 1, wherein determining the identity is based on information regarding at least one of a frequency and a periodicity of the SS/PBCH block transmission.

10. A non-transitory computer storage medium storing an executable computer program comprising instructions configured to cause processing circuitry to at least one of control and perform a method of operating a network node in a radio access network, the method comprising:
- determining an identity associated to a second network node based on:
  - a received Synchronization Signal/Physical Broadcast Channel, SS/PBCH, block transmission received from the second network node; and
  - a determined time shift of the SS/PBCH block transmission relative to a slot structure.

11. The network node according to claim 2, wherein determining the identity comprises receiving the SS/PBCH block transmission in an Up Link, UL, time interval.

12. The network node according to claim 2, wherein the identity is one of a group identity, a cell identity and a network node identity.

13. The network node according to claim 2, wherein determining the identity is based on angular information pertaining to the received SS/PBCH block transmission.

14. The network node according to claim 2, wherein determining the identity is based on information indicating an association between the identity and at least one of:
- distance; and
- the determined time shift.

15. The network node according to claim 2, wherein determining the identity is based on network information indicating at least one of:
- groups of network nodes;
- groups of cells;
- associated locations; and
- distances.

16. The network node according to claim 2, wherein determining the identity comprises transmitting an identity indication indicating the identity to a third network node.

17. The network node according to claim 16, wherein the third network node is one of a radio network node and a core network node.

18. The network node according to claim 2, wherein determining the identity is based on information regarding at least one of a frequency and a periodicity of the SS/PBCH block transmission.

19. The method according to claim 3, wherein the identity is one of a group identity, a cell identity and a network node identity.

20. The method according to claim 8, wherein the third network node is one of a radio network node and a core network node.

* * * * *